3,492,279
CHLORINATED AMORPHOUS POLYPROPYLENE COMPOSITIONS

Paul D. Folzenlogen, Marvin B. Edwards, and Hugh J. Hagemeyer, Jr., Longview, Tex., assignors to Eastman Kodak Company, Rochester, N.Y., a corporation of New Jersey
No Drawing. Filed Jan. 21, 1965, Ser. No. 427,161
Int. Cl. C08f 27/03
U.S. Cl. 260—93.7                   4 Claims

---

ABSTRACT OF THE DISCLOSURE

Novel chlorinated amorphous polypropylenes of improved thermal and color stability and a process for their preparation comprising reacting amorphous polypropylene containing less than about 0.005% by weight of ash with chlorine in the presence of a chlorination promoter. As embodiments of the invention are included blends of the novel chlorinated amorphous polypropylene with plasticizers and/or other resins.

---

The present invention concerns new chlorinated amorphous polypropylenes having remarkably improved properties such as high softening point, good tensile strength, stiffness, hardness, transparency, solubility in useful casting solvents, heat stability, color stability, flame resistance, and compatibility with other resins and plasticizers. The invention further concerns plasticized and resin modified forms of this new material finding a wide variety of uses.

Heretofore, the use of known forms of chlorinated amorphous polypropylene has been necessarily restricted to those applications where high temperature stability as exemplified by thermal degradation resistance and color permanence is not important. While the belief that greater degrees of chlorination of such amorphous polypropylene should enhance its degradation resistance and color permanence has been widespread, the fact is that when more than about 12% by weight of chlorine is introduced into the armorphous polymer, severe depolymerization occurs and the high temperature stability and color permanence of the polymer is lost.

Objects of the present invention, therefore, are: to provide chlorinated amorphous polypropylene material, hereinafter referred to as CLAMP, having greatly improved thermal and color stability; to provide such material also having one or more properties such as good tensile strength, stiffness, hardness and compatibility with other resins and polymers; to provide plasticized forms of this material; to provide blends of this material with other useful resins and polymers; to provide such materials for use as coatings for all types of substrates including wood, metals, concrete, asphalt, paper, composition board, plastics, wire, electrical cable and rope; and to provide a commercially practicable process for preparing such materials.

These and other objects hereinafter appearing have been achieved in accordance with the present invention through the discoveries: that when the ash content of amorphous polypropylene is reduced to below about 0.005% by weight, it can be chlorinated to a very high degree without significantly degrading, coloring or darkening; that such chlorinated material is thereafter thermally stable and has excellent color stability; that when the chlorine content of the polymer reaches about 30% by weight, the aforesaid physical properties of the polymer such as tensile strength and softening point improve quite substantially and unexpectedly; that the chlorinated material may be blended with conventional polyvinyl chloride plasticizers to give tough, resinous systems of high impact strength; and that both the plasticized and unplasticized chlorinated material may be blended with other resins such as the alkyds to improve the hardness, drying time and chemical resistance thereof. In particular it is noted that the color stabilities of the present polymers at elevated temperatures are substantially improved over many other commercial chlorinated materials, and are remarkably improved over commercial polyvinyl chloride coating resins.

The CLAMP materials of the present invention may be characterized as follows:

TABLE I

| | |
|---|---|
| Physical form | White powder. |
| Chlorine content, wt. percent | >5. |
| Specific gravity | From about 0.86 to 1.75. |
| Bulk density, lb./ft.$^3$ | From about 9.5 to 44. |
| Vicat softening point, °C. | From about 23 to 210. |
| Sward hardness, percent of glass | From about 0 to 90. |
| Tensile strength, p.s.i. | From about 10 to 10,000. |
| Solution properties; 20 wt. percent in toluene: | |
|   Viscosity @ 25° C., Brookfield, cp. | From about 4 to 200. |
|   Color, Gardner scale | <10. |
|   Color, after polymer heated in air 4 hr. @ 175° C., Gardner scale | <18. |
| Weight loss as HCl on heating for 20 hr. @ 175° C. under $N_2$ purge, wt. percent | <20. |
| Ash content, wt. percent (after chlorination) | <.01. |
| General resistance to | |
|   Acids | Excellent. |
|   Bases | Excellent. |
|   Salt spray | Excellent. |
|   Alcohols | Excellent. |
|   Aliphatic hydrocarbons | Good at chloride content >35 wt. percent. |
|   Aromatic hydrocarbons | Soluble. |
|   Esters | Soluble. |
|   Ketones (except acetone) | Soluble. |
| Chlorinated hydrocarbons | Soluble. |
| Nonflammable at Cl content | >40 wt. percent. |

It must be recognized, of course, that varying degrees of chlorination give varying product characteristics. Thus, the present CLAMP materials having a chlorine content of from about 5 to about 30 wt. percent are permanently tacky and, therefore, especially useful as contact adhesives. On the other hand, a chlorine content of from about 30 to about 50 wt. percent gives products which are hard, soluble in common lacquer solvents, more flexible than the higher chlorine content resins, and which are resistant to acids and bases. These resins are useful in inks and protective coatings. Further, a chlorine content of from about 50 to about 72 wt. percent gives products which are very hard, soluble in common lacquer solvents, and nonflammable. These resins show maximum resistance to acids and bases and are compatible with many other film-forming resins. These resins are especially useful in inks and protective coatings.

Of particular value are the CLAMP materials containing from about 60 to about 70% by weight of chlorine and having a Vicat softening point greater than about 110° C., a tensile strength at yield greater than about 1000 p.s.i., a hardness greater than about 110 on the Rockwell R. Scale, a stiffness in flexure greater than about 200,000 p.s.i. and an ash content less than about 0.01% by weight, said chlorinated amorphous polypropylene being formable at temperatures of up to about 150° C. without developing significant color or odor.

The process of the present invention consists of contacting specially processed amorphous polypropylene dissolved in an inert solvent with gaseous chlorine in the presence of ultraviolet light or a suitable free radical catalyst such as diisopropyl peroxy dicarbonate, bis(azobisisobutyronitrile), lauryl peroxide, benzoyl peroxide, methyl ethyl ketone peroxide, and decanoyl peroxide. One of the most significant aspects of the present invention is that the starting amorphous polypropylene must have an ash content of less than about 0.005% and preferably less than about 0.001%. The viscosity of the starting material may range from about 500 to about 1,000,000 cp. at 150° C. with the preferred range being between about 15,000 and about 40,000 cp. at 150° C. The color of the starting material should be <5 and preferably <1 on the Gardner scale. Minor amounts of crystalline and/or stereoblock polypropylenes admixed with the amorphous polypropylene can be tolerated. The useful catalysts for preparing such polymers include the stereospecific Ziegler types as well as other ionic catalysts. It is noted that those catalysts which are completely insoluble in the polymer and reaction medium are preferred in order that essentially complete removal thereof from the polymer may be achieved.

An exemplary and particularly suitable method for obtaining amorphous polypropylene for use in the present invention involves the solution polymerization of propylene at 150° C. and 1000 p.s.i. in mineral spirits in the presence of a catalyst consisting of equimolar portions of lithium aluminum hydride, titanium trichloride, and sodium fluoride. It is noted that lithium metal may be substituted for all or part of the lithium aluminum hydride, and that titanium tetrachloride may be substituted for all or part of the titanium trichloride. Other halides of Group IVa, Va and VIa transition elements can also be used in place of the TiCl$_3$. Both crystalline and amorphous polypropylene are formed in this process and become dissolved in the solvent. Solvent is removed from the colorless filtrate by stripping with dry propylene gas. The recovered polypropylene is then melt extruded into strands and chopped into pellets which are extracted with boiling hexane. The crystalline polypropylene remains undissolved while the amorphous polypropylene is recovered from the hexane extraction solvent. Typically, this amorphous polypropylene after refining as described in the example below has a Gardner color of less than about 1, an ash content of less than about 0.005% and a viscosity of from about 10,000 to about 30,000 cp. at 150° C.

The catalyst separation or refining method referred to above consists essentially of contacting a melt, solution or dope of the amorphous polymer with hydrogen in the presence of a hydrogenation catalyst, and thereafter filtering the insoluble catalyst residues from the polymer. The following example will further illustrate this procedure.

A mineral spirits solution of amorphous polypropylene obtained by the hexane extraction of polypropylene made by the solution polymerization of propylene using a TiCl$_3$–LiAlH$_4$ catalyst, was hydrogenated in a 1-liter stirred Parr autoclave at 150–200° C. and 200 p.s.i.g. The original amorphous polymer had a melt viscosity of 91,800 cp. at 150° C., a Gardner color of 3 and an ash content of 0.017%. A contact time of two hours was used for the hydrogenation procedure in which the autoclave was charged with the solution of 100 g. of the amorphous polypropylene in 375 ml. of mineral spirits containing 2 g. of powdered catalyst (50% nickel on kieselguhr). After the hydrogenation, the solution was filtered and the polymer concentrated. By virtue of the hydrogenation, the color was reduced to less than 1 on the Gardner scale, the ash content reduced to less than about 0.005%, and the thermal stability of the polymer greatly increased. For example, after 26 hours of heating at 190° C. in the presence of air, the viscosity of a sample of the hydrogenated polymer dropped 30% while a sample of the non-hydrogenated polymer experienced a viscosity drop of 50%.

An alternative method for obtaining the amorphous polypropylene starting material comprises polymerizing propylene at about 70° C. with a catalyst composed of either ethyl aluminum sesquichloride or ethyl aluminum sesquibromide, and tetraoctyl titanate. At the conclusion of the polymerization, the product is washed repeatedly with hot isobutanol and then dissolved in mineral spirits at 150° C. The resultant dope is filtered through an acid-activated powdered montmorillonite precoated filter, stripped of the mineral spirits, and the polymer then melt extruded into strands and chopped into pellets. The pellets are extracted with hexane and the amorphous polypropylene recovered from the extract. Regardless of the method employed to manufacture the amorphous polypropylene, it is essential that the polymer be substantially colorless and contain les than about 0.005% ash by weight based on the amorphous polymer.

For the chlorination procedure which may be carried out either batchwise or continuously, the solvent should be one which is inert to elemental chlorine and to hydrogen chloride, the principal byproduct of the reaction. Suitable solvents include halogenated aromatics and halogenated aliphatics. Carbon tetrachloride is highly satisfactory and has been used for many of the investigations. The solvent must be of a high degree of purity and contain very low amounts, less than about 100 p.p.m. and preferably less than about 1 p.p.m. of components which yield ash on burning. The solvent should be colorless and low boiling for easy removal from the polymer product. It is noted that the ash content of the chlorinated, amorphous polypropylene product is preferably less than about 0.01% by weight of the polymer.

The concentration of amorphous polypropylene in the chlorination solvent may be varied, but, generally should not exceed about 20% by weight, the preferred range being from about 5 to about 12% by weight. Concentrations greater than about 20% lead to solutions of excessively high viscosity which are somewhat difficult to stir adequately. The chlorination temperature may also be varied, but, at about 160° C. the chlorinated polymer becomes susceptible to degradation. The minimum practical chlorination temperature is about 10° C. since the chlorination reaction is extremely slow below this point. The preferred chlorination temperature range is from about 10 to about 80° C. In some instances it is desirable that the reaction be carried out under a moderate chlorine pressure in order to increase the solubility of the chlorine in the liquid phase. Generally the reaction is carried out merely by metering chlorine gas into a well-stirred solution of the amorphous polypropylene in the solvent.

The progress of the chlorination reaction can be followed in a number of ways, the preferred one being to periodically isolate samples of the chlorinated polypropylene and determine their densities. Chlorine content is directly related to density and can be determined from a graph of these two variables. Alternative ways of following the reaction include (1) determining the viscosity of the reaction mixture, and (2) measuring the quantity of hydrogen chloride liberated in the course of the reaction. When the desired chlorine content is reached, the polymeric product may be isolated by any of a number of methods well known to the art. Spray drying is particularly suitable and is preferred for commercial or continuous operation. Alternatively, the solvent may be removed by stripping with a hot gas or by steam distillation. Still another method of isolation involves precipitating the chlorinated amorphous polypropylene in a low molecular weight alcohol or a mixture of alcohol and water, and following by filtering, washing, and drying the powdered product.

The increased color stability of the final chlorinated product and the role played by the very low ash starting material is illustrated by the comparison experiment of Example 1 below. The ash content was determined in the conventional manner by burning a 5-gram sample of dry polymer in a platinum crucible for 20 minutes at 900° C. The crucible was brought to constant weight in a desiccator during a 30-minute period before obtaining the tare weight and the weight of the burned residue.

EXAMPLE 1

A twenty-gram sample each of chlorinated amorphous polypropylene prepared from a relatively high ash (0.016%) and of a low ash (<0.001%) amorphous polypropylene were stored in open test tubes in an oil bath at 150° C. At intervals, samples were withdrawn and dissolved in toluene to make 33% solutions. The color of each solution was determined in a Gardner Color Comparator to measure the stability of the original samples. The results which illustrate the injurious effects of high ash content are as follows:

TABLE 1

| | Sample I | Sample II |
|---|---|---|
| Chlorine Content, percent | 66.0 | 66.9 |
| Ash, percent | <0.001 | 0.016 |
| Color, Gardner Scale: | | |
| 0 Hrs | 1 | 3 |
| 4 Hrs | 3 | 12 |
| 24 Hrs | 8 | 14 |

It is particularly noteworthy that this great resistance to degradation and color change of the present chlorinated amorphous polypropylene, hereinafter designated CLAMP, renders it highly useful in blends with other resins such as the alkyds which are baked on at elevated temperatures. In order to further illustrate this remarkable thermal stability, twenty grams of each of CLAMP and several commercial chlorinated polymers were placed in separate 30 mm. x 280 mm. test tubes heated by immersion in a 175° C. oil bath. A slight nitrogen purge, 40 cc./min./tube, was maintained over the test tubes. The off gas was scrubbed with caustic and the amount of hydrogen chloride evolved in 20 hours was noted. The results are recorded in the following Table 2 as weight percent of the polymer lost as HCl after 20 hours at 175° C. In the table, the following should be noted: all stabilizers were removed from the polymers; Parlon S and Parlon P denote chlorinated natural rubber and chlorinated polypropylene respectively marketed under these names by Hercules Powder Co.; the number after each Parlon designation denotes the approximate viscosity at 25° C. in cp. of a 20 wt. percent solution in toluene; and VMCH designates a commercial vinyl chloride-vinyl acetate copolymeric (12–15% vinyl acetate) coating resin.

TABLE 2

| Polymer | Approximate percent by wt. of Cl | Weight percent loss as HCl after 20 hours at 175 °C. |
|---|---|---|
| CLAMP | 64.2 | 1.79 |
| CLAMP | 64.2 | 1.81 |
| CLAMP | 63.3 | 0.43 |
| CLAMP | 68.2 | 1.11 |
| CLAMP | 67.7 | 1.10 |
| Parlon P-5 | >65.0 | 3.85 |
| Parlon P-10 | >65.0 | 3.45 |
| Parlon S-20 | 67.0 | 3.04 |
| Parlon S-20 | 67.0 | 3.34 |
| Parlon P-5 | >65.0 | 3.97 |
| Parlon S-10 | 67.0 | 4.01 |
| Parlon P-10 | >65.0 | 3.61 |
| Parlon S-5 | 67.0 | 3.46 |
| VMCH | | 20.10 |
| Polyvinyl chloride | | 30.70 |
| Polyvinylidene chloride | | 10.60 |

In the following Examples 2–5 which further illustrate the present chlorinated amorphous polypropylene, the tensile strengths were determined on an Instron Tensile Tester employing samples formed by compression molding at approximately 1000 p.s.i., and at about 30° C. above the softening point of the polymer. The samples were obtained from the polymer moldings measuring 6″ x 6″ x ⅛″ by cutting these moldings into ½ in. wide samples. These samples were clamped between the jaws of the Instron tester and pulled at 2 in./min. until the peak loads or tensile yield strengths were obtained.

EXAMPLE 2

One pound of purified amorphous polypropylene having a melt viscosity of 18,400 cp. at 150° C., a Gardner color of 1, and an ash content of less than 0.001% was dissolved at room temperature in 2800 milliliters of high purity carbon tetrachloride. The amorphous polypropylene was obtained by a boiling hexane extraction of the polymerization product obtained by contacting propylene at 150° C. and 1000 p.s.i. with a catalyst composed of equimolar amounts of lithium aluminum hydride, titanium trichloride, and sodium fluoride. The solution was transferred to a 5-liter, 4-necked flask fitted with a stirrer, a chlorine inlet tube, a reflux condenser which led to a trap to absorb unreacted chlorine and hydrogen chloride, and two quartz probes which emitted ultraviolet light. Chlorine gas was bubbled through the agitated solution for 15 hours at a rate of 75 grams per hour. As the reaction proceeded, the temperature rose gradually from 25° C. to 60° C. At the end of the 15-hour period, the amorphous polypropylene contained 57.8% by weight of chlorine. The product was worked up by stripping chlorine and HCl from the solution by bubbling nitrogen therethrough at room temperature for 12 hours. The polymer was recovered by precipitation in cold methanol followed by three successive washes with fresh cold methanol. The dry product weighed 1100 g. and had a Vicat softening point of 120° C. compared to less than 23° C. for the starting amorphous polypropylene. The tensile strength of the starting polymer of 29 p.s.i. was increased to 5500 p.s.i. by the chlorination. This product was readily soluble at room temperature in aromatic, chlorinated aliphatic, and most ketone type solvents. The color of the product was No. 1 on the Gardner scale and did not ignite when subjected to flame.

EXAMPLE 3

A 400-gram sample of the purified, low ash amorphous polypropylene prepared as in Example 2 and having a melt viscosity of 18,000 cp. at 150° C. was dissolved at room temperature in 2500 milliliters of freshly distilled carbon tetrachloride. This solution was placed in a 5-liter flask equipped with stirrer, chlorine inlet, thermowell, reflux condenser and dropping funnel. The solution was saturated with chlorine gas at 50° C. and agitated for a 12-hour period while 100 milliliters of a 24% (by weight) solution of diisopropyl peroxydicarbonate in heptane was added. At the end of the reaction period, the solution was heated to the boiling point for one hour to decompose all of the peroxide catalyst. The chlorinated amorphous polypropylene was worked up as in Example 2 to yield a product containing 64.3% chlorine. This product had the following properties:

| | |
|---|---|
| Vicat softening point _____° C__ | 162 |
| Tensile strength at yield _____p.s.i__ | 6600 |
| Color, Gardner scale _____ | 1 |
| Ash content _____percent__ | <0.001 |

The polymer was also flame resistant and could be molded or extruded, when plasticized at 170–190° C. without noticeable color or odor formation.

EXAMPLE 4

Example 3 was repeated with the substitution of 8 grams of bis(azobisisobutyronitrile) for the diisopropyl peroxydicarbonate catalyst. The catalyst was added in a single charge at the start of the chlorination process. Total reaction time was 12 hours. The chlorinated amorphous polypropylene contained 61.3% chlorine and had the following properties.

| | |
|---|---|
| Vicat softening point °C | 140 |
| Tensile strength at yield p.s.i. | 5900 |
| Color, Gardner scale | 1 |
| Ash content percent | <0.001 |

EXAMPLE 5

Purified amorphous polypropylene was prepared as in Example 2, except that lithium metal was substituted for lithium aluminum hydride in the catalyst. The unchlorinated material had the following properties:

| | |
|---|---|
| Viscosity at 150° C. cp. | 25,000 |
| Color, Gardner scale | 1 |
| Ash content percent | <0.002 |
| Vicat softening point °C | 23 |
| Tensile strength at yield p.s.i. | 50 |

A 500-gram sample of this material was dissolved in 2500 ml. of tetrachloroethane and contacted with chlorine gas at 50° C. for six hours. A catalyst solution comprising 100 ml. of a 4% solution of diisopropyl peroxydicarbonate in heptane was added in two portions, 50 ml. at the start of the run and 50 ml. three hours after the start of the chlorination. At the end of the reaction period the solution was cooled to room temperature and poured into cold methanol. The chlorinated amorphous polypropylene precipitate was washed three times with cold methanol and dried. The product contained 38.8% chlorine and had the following properties:

| | |
|---|---|
| Vicat softening point °C | 70 |
| Tensile strength at yield p.s.i. | 1600 |
| Color, Gardner scale | 1 |
| Ash content percent | <0.001 |

As aforesaid, plasticization of the present chlorinated amorphous polypropylene is an important aspect of the invention. The plasticizers useful for improving certain of the physical properties of the CLAMP materials include the monomeric and polymeric types, whether they be considered as primary or secondary in their ability to plasticize. In order to more clearly illustrate the variety of plasticizers useful in practicing the present invention, the following discussion is thought to be in order. Plasticizers may be defined as high boiling organic liquids or low melting solids which are added to an otherwise hard or tough resin to impart flexibility thereto. In the simplest terms, the main difference between ordinary solvents and plasticizers is volatility, which in the case of plasticizers, is quite low. The plasticizer's softening action (plasticization) is usually attributed to its ability to reduce the intermolecular attractive forces of the polymeric system. This plasticizing action may be theorized in either of the following ways:

(1) The attractive forces between the resin molecules are reduced by neutralization of the charges of the molecules by the plasticizer. In other words, the polymer molecules are "tied-up" and are no longer available to attract adjacent molecules. When these attractions between polymer and plasticizer are strong, a true solvent action occurs and the plasticizer is called a "solvent type" and (2) The plasticizer forces the polymer molecules apart. Thus, distance alone is used to soften the polymer. In this instance, the physical attraction is obtained by sheer force. If the attraction between the polymer and plasticizer is negligible, the plasticizer is called a non-solvent type and the plasticizer functions merely as a spacer. Because the plasticizer is inserted and placed in position under heat (fusion), the molecular forces of the polymer exert a force upon the plasticizer when the compound returns to room temperature equilibrium, and in many cases, the non-polar plasticizer will be forced out. This condition is known as exudation or "spew."

Plasticizers may be structurally classified either as monomeric or polymeric, and functionally, they may be classified as primary and secondary. Monomeric plasticizers are simple monoesters or diesters of monobasic and dibasic acids or alcohols. Polymerics are complex polyesters of dibasic acids and dihydric alcohols having much higher molecular weights than monomerics, ranging from about 800 to 7,000.

Primary plasticizers are compounds that can be used as the sole plasticizer. The most common types are the phthalates, the phosphates, dibasic acid esters, and polymeric plasticizers. DOP (di-2-ethylhexyl phthalate) is the most widely used general purpose plasticizer. Such general purpose plasticizers provide an even balance of compound properties after fusion and are suited for plastisols because of the good flow properties provided. The most efficient plasticizers for vinyls are dibasic acid esters which provide maximum flexibility over a wide temperature range and also impart good flow properties to plastisols. Phosphate plasticizers are used primarily to impart flame retardant and chemical resistant properties to vinyl formulations. Polymeric polyesters and relatively high-molecular-weight monomeric plasticizers are used as primary plasticizers in applications requiring maximum permanence because of their resistance to migration, extraction, and volatilization. Satisfactory plastisol viscosity is obtained by using combinations of polymeric and general purpose plasticizers.

Secondary plasticizers are used in vinyl formulations to lower compound cost and to obtain specific compound properties. The type and amount of secondary used in any formulation is limited by the side effects on compound properties such as physical properties, color, stability, extractability and volatility. The chlorinated types are used for chemical and flame resistance, the epoxy type for light and heat stability. Monomeric epoxy plasticizers are slightly less effective heat stabilizers but provide improved low temperature flex. The following Table 3 contains a listing of a number of useful plasticizers and the outstanding characteristic imparted to vinyl plastics thereby.

TABLE 3.—CHEMICAL COMPOSITION AND OUTSTANDING CHARACTERISTICS OF PLASTICIZERS

| | | Outstanding Characteristic |
|---|---|---|
| Monomeric Type: | | |
| (DOP) | Di-(2-ethylhexyl) phthalate. | General purpose. |
| (DIOP) | Di-(2-ethyl-4-methylpentyl) phthalate. | Do. |
| (DCP) | Di-capryl phthalate. | Do. |
| (DIDP) | Di-isodecyl phthalate. | Volatility. |
| | Di-(2-ethylhexyl) hexahydrophthalate. | General purpose. |
| | Cresyl diphenyl phosphate. | Volatility, flame resistance. |
| (TCP) | Tricresyl phosphate. | Do. |
| (DOA) | Di-(2-ethylhexyl) adipate. | Low temp. |
| (DOS) | Di-(2-ethylhexyl) sebacate. | Low temp., light stability. |
| (DOZ) | Di-(2-ethylhexyl) azelate. | Low temp. |
| | Monomeric epoxy (2-ethylhexylepoxytallate). | Heat and light stability, low temp. |
| | Triethylene glycol dicaprylate. | Heat stability, high thixotropy. |
| | Acetyl tributyl citrate. | Non-toxicity. |
| Polymeric Type: | | |
| | Benzoic acid ester of TMPD * monoisobutyrate. | Stain Resistance. |
| | Polyester of NPG and adipic acid (M.W.=1,200–1,300). | Permanence. |
| | Epoxidized Soy Bean Oil (M.W. approx. 1,000). | Heat and light stability. |
| | Polyester of TMPD and adipic acid terminated with the monoisobutyrate of TMPD (M.W.=800–1,000). | Permanence. |
| Extender Type: | | |
| | Chlorinated (up to 70% by weight and higher of chlorine) resinous paraffin (volatile liquids to solids). | Chemical resistance. |
| | Liquid aromatic hydrocarbon mixtures (M.W.=100–800). | Viscosity improver. |
| | High boiling (above about 200° C.) liquid mixture of partially hydrogenated terphenyls. | Do. |
| | Iso-octyl palmitate. | Viscosity and light stability. |

* 2, 2,4-trimethyl-1,3-pentanediol.

The following plasticizers are especially compatible with the chlorinated polypropylene and therefore have broad utility for the present compositions: chlorinated biphenyls of about 50–65% by wt. of chlorine; chlorinated paraffin waxes of molecular weights of from about 200–2000 and containing from about 35–75% by wt. of chlorine; dibutyl phthalate; dioctyl phthalate; dioctyl sebacate; tricresyl phosphate; trioctyl phosphate; raw linseed oil; boiled linseed oil; thermolyzed tung oil; acrylic ester coating resins; and epoxidized soy bean oil. The most preferred types of plasticizers, however, are those selected from the group consisting of esters of dibasic acids, epoxidized esters, organophosphates, and organic carboxylic acid esters of polyhydroxy compounds.

The applications in which compositions containing plasticized chlorinated amorphous polypropylene are superior include films and coatings on wood, masonry, ceramic, metal, paper and paperboard. The plasticized compositions exhibit excellent solubility at room temperature in common lacquer solvents, and the application characteristics are excellent. Films and coatings containing 25–35 percent plasticizer cast from solutions show very little tendency to craze or check. The freedom from checking is particularly noticeable when successive coats are applied in relatively rapid succession. Gloss is generally about 100%, and transparencies are generally higher than 80%. The moisture vapor transmission rates (MVTR) of the films and coatings are quite low. The exact MVTR values vary with the type and amount of the plasticizer, but, most formulations give values of 1–3 grams of water per 100 in.$^2$/24 hours for a one-mil film. These values compare quite favorably with 3–15 grams of water per 100 in.$^2$/24 hours for a one-mil film of similarly plasticized polyvinyl chloride.

The following discussion is given in order to illustrate the value of plasticizers in tailoring the characteristics of resinous systems containing CLAMP. An important characteristic of CLAMP is its low gas permeability which makes it quite useful as gas barrier coatings for all types of polymeric materials including vinyl and polyolefin films, cellulose acetate films, and other plastic materials. For example, several 0.06-mil coatings of CLAMP on a 1-mil polypropylene sheet gave the following results:

| Sample | Coating | O$_2$ permeability, cc./100 in.$^2$/24 hr./mil |
|---|---|---|
| 1 | None | 124 |
| 2 | CLAMP, 40% Cl | 56 |
| 3 | CLAMP, 50% Cl | 35 |
| 4 | CLAMP, 69% Cl | (¹) |

¹ Did not adhere.

While it was expected that the fourth sample should have an oxygen transmission rate of about 8 cc./100 in.$^2$/mil/24 hr., the lack of adherence prevented the test. This adherence problem is easily met, however, by blending with the CLAMP about 30% by weight of a chlorinated paraffin liquid wax plasticizer containing about 70% by weight of chlorine.

The plasticizer can be added to the CLAMP material by any of the conventional methods including blending in a Banbury mixer or on mill rolls. The plasticizer may also be added by dissolving it and the chlorinated amorphous polypropylene in a suitable common solvent such as toluene, and then separating the blend from the solvent by drying or coprecipitation. Where desired, a polymeric impact modifier such as synthetic rubber, or ethylene-vinyl acetate copolymer may also be added.

The following Table 4 further illustrates the results of such plasticizing on one mil films prepared by dissolving both the chlorinated amorphous polymer and the plasticizer in toluene, and thereafter casting from the solution:

TABLE 4.—PROPERTIES OF PLASTICIZED CHLORINATED AMORPHOUS POLYPROPYLENE UNSUPPORTED FILMS

| Ex. | Weight percent of Chlorine in Base Polymer | Plasticizer | Phr. Plasticizer | Film Gloss, percent | Film Transparency, percent | MVTR, g. H$_2$O/100 in.$^2$/24 Hr. | Tensile Strength, p.s.i. At Yield | At Break | Percent Elongation |
|---|---|---|---|---|---|---|---|---|---|
| 6 | 67 | Dioctyl Phthalate | 60 | 100 | 97 | 1.9 | 181 | 160 | 100 |
| 7 | 62 | Di-(2-ethylhexyl) adipate | 60 | 100 | 90 | 1.3 | 280 | 150 | 100 |
| 8 | 52 | Diisobutyl Phthalate | 50 | 100 | 92 | 2.5 | 200 | 130 | 150 |
| 9 | 35 | Dibutyl Phthalate | 15 | 95 | 88 | 3.0 | 250 | 210 | 90 |
| 10 | 69 | Tritolylphosphate | 60 | 100 | 91 | 1.1 | 345 | 290 | 30 |

The selection of the formulations within the scope of the present invention depends on the intended application. For supported films or coating on such substrates as paper, wood, and metal, chlorinated amorphous polypropylene containing a plasticizer is highly desirable. Such formulations employ from about 5–50 parts of plasticizer per 100 parts (phr.) of the polypropylene with about 15–35 phr. being the preferred range. Higher concentrations of plasticizer, however, may be employed for special applications. The effects of plasticization, and some of the preferred plasticizers are further illustrated in the specific surface coating formulations subsequently appearing herein.

For unsupported films and strippable coatings applications, blends of plasticized chlorinated amorphous polypropylene and other polymers and copolymers are generally preferred. The useful amounts of polymeric modifier can also vary from about 5–50%, but, preferred results are usually obtained in the 20–50% range. Typical polymeric modifiers include acrylonitrile-butadiene rubbers, alkyd resins, chlorinated terphenyls, polyvinyl chloride resins, acrylics, vinyl chloride-vinyl acetate copolymers, chlorinated polyethylene waxes, ethylene-vinyl acetate copolymers, chlorinated polyethylene waxes, ethylene-ethyl acrylate copolymers, chlorinated rubbers, phenolics and modified phenolics, chlorinated terphenyls, chlorinated paraffins, cellulose acetate, and styrenated alkyds. It is noted that where certain resins are not properly compatible with the chlorinated polypropylene, a third component which is compatible with all of the polymeric components may be employed as a blending aid.

Particularly useful modifiers are alkyd resins, ethylene-vinylacetate copolymers, chlorinated terphenyl resins, chlorinated biphenyls, and chlorinated resinous materials such as chlorinated paraffin waxes. The useful chlorinated terphenyl resins contain from about 40 to about 65% by weight of chlorine and range from sticky to solid materials. The useful chlorinated biphenyls contain from about 20 to about 65% by weight of chlorine and range from oils to sticky resins. The useful chlorinated paraffin wax resins contain from about 55 to about 75% by weight of chlorine and have molecular weights of between about 500 to 3000.

In general, the preferred alkyd resin type modifiers are those derived from phthalic anhydride, glycerine or pentaerythritol, and vegetable oils. Such resins have the following characteristics:

Percent phthalic anhydride by weight 20 to 40.
Gardner-Holdt viscosity at 25° C. and 70% solids in mineral spirits or xylene _____ T to Z-6.
Percent oil by weight _____ 50 to 70.
Oil type _____ Castor, soya, linseed, or tung.

Three specific ones of such alkyd resins have the following characteristics:

| Resin | Acid Number of Solids | Gardner-Holdt Solution, Viscosity at 25° C. | Percent Phthalic Anhydride in Solids | Percent Oil in Solids | Type Oil |
|---|---|---|---|---|---|
| 1. (70 wt. percent in xylene) | [1] 8 | Z-3 | 32 | 55 | Castor. |
| 2. (70 wt. percent in mineral spirits) | [1] 8 | Z-2 | 24 | 65 | Soya. |
| 3. (70 wt. percent in mineral spirits) | 4-8 | W-Y | 27 | 56 | Linseed. |

[1] Maximum.

Properly modified chlorinated polypropylene coatings have an excellent combination of hardness, toughness, and chemical resistance, and are useful as vehicles for chemical and moisture resistant surface coatings. In such coatings, it is desirable to add to the chlorinated polypropylene about 1 percent, based on weight of polypropylene, of an epoxy stabilizer. About one-half of one percent, based on the chlorinated polymer, of epichlorohydrin should also be added to polymer solutions which are to be stored in cans for prolonged periods. It is noted that coatings based on blends of CLAMP and ethylene-vinyl acetate copolymers (about 15–50% vinyl acetate) are particularly tough, comparing favorably with vinyl chloride coating resins. In these blend formulations, from about 20 to about 50 parts by weight of the said copolymers per 50 parts by weight of the CLAMP are preferred. In addition, these blends can also be used at higher solids contents and with cheaper solvents. Table 5 below illustrates these blends.

TABLE 5.—MODIFIED CHLORINATED POLYPROPYLENE COATINGS

| | Weight Percent | | | | | | | |
|---|---|---|---|---|---|---|---|---|
| | 11 | 12 | 13 | 14 | 15 | 16 | 17 | 18 |
| Constituent: | | | | | | | | |
| Chlorinated Polypropylene (CLAMP) | 60.0 | 65.0 | 66.7 | 50.0 | 45.0 | 67.0 | 67.5 | 60.6 |
| Ethylene-Vinyl acetate copolymer (40% vinyl acetate) | 40.0 | 35.0 | 33.3 | 33.3 | 30.0 | | 7.5 | 30.2 |
| Chlorinated wax (40% Cl) | | | | | | 33.0 | 25.0 | |
| Chlorinated wax (70% Cl) | | | | | 25.0 | | | |
| Chlorinated biphenyl (60% Cl) | | | | | | | | 9.2 |
| Chlorinated terphenyl (60% Cl) | | | | 16.7 | | | | |
| | 100.0 | 100.0 | 100.0 | 100.0 | 100.0 | 100.0 | 100.0 | 100.0 |
| Properties: | | | | | | | | |
| Percent Elongation (conical mandrel) | >32 | >32 | >32 | >32 | >32 | >32 | >32 | >32 |
| Sward Hardness | 33 | 60 | 60 | 32 | 29 | 25 | 33 | 39 |
| Impact Strength, in.-lb.: | | | | | | | | |
| a. Forward | >30 | >30 | >30 | >30 | >30 | 10 | 20 | >30 |
| b. Reverse | >30 | >30 | >30 | >30 | >30 | <5 | 5 | >30 |
| Adhesion to steel | (1) | (1) | (1) | (1) | (1) | (1) | (1) | (1) |
| Resistance [2] to: | | | | | | | | |
| 96% $H_2SO_4$ | (3) | | | (3) | (3) | NE | NE | NE |
| 50% $H_2SO_4$ | NE | NE | NE | NE | NE | NE | NE | NE |
| 10% $H_2SO_4$ | NE | NE | NE | NE | NE | NE | NE | NE |
| 86% $H_3PO_4$ | NE | NE | NE | NE | NE | NE | NE | NE |
| 10% HCl | NE | NE | NE | NE | NE | NE | NE | NE |
| 50% KOH | NE | NE | NE | NE | NE | NE | NE | NE |
| 10% NaOH | NE | NE | NE | NE | NE | NE | NE | NE |

[1] Excellent.
[2] Spot tested for one week at 77° F.
[3] Blistered.
NE=No Effect.

EXAMPLE 19

A lacquer formulation was made by stirring the following ingredients into xylene at room temperature:

70 parts of chlorinated amorphous polypropylene (67% Cl)
26.8 parts of epoxidized soy bean oil
140 parts of mixed xylenes.

The viscosity of the formulation was 74 cp. at 25° C. This formulation was applied to plywood in three successive coats at two-hour intervals. The coating weight was such that one pound of the plasticized polymer would cover 65 square feet. The resulting coating upon drying was very hard, glossy, smooth, and had excellent adherence to wood. No changes were noted after aging for three months.

EXAMPLE 20

This formulation was made by stirring the following ingredients into toluene and then applying to concrete:

20 parts of chlorinated amorphous polypropylene (65.8% Cl)
5 parts of chlorinated wax (40% Cl)
13 parts of a long oil, oxidizing alkyd resin
30 parts of toluene.

Upon drying, the resulting coating adhered well to the concrete and was comparable to chlorinated rubber coatings.

EXAMPLE 21

The following lacquer formulation was applied to paper:

2 parts of chlorinated amorphous polypropylene (60% Cl)
0.5 part of acrylonitrile-butadiene rubber
0.5 part of epoxidized soy bean oil
6 parts of toluene.

The 3-mil coating could not be separated from the paper which had a high gloss, an MVTR of 1.01 g. of water/100 in.²/24 hr., and was very smooth.

EXAMPLE 22

Soft drawn copper wire size No. 22 ANG was extrusion coated with chlorinated amorphous polypropylene (67% Cl) containing 30 phr. of epoxidized soy bean oil and 30 phr. of an ethylene-vinyl acetate copolymer (29% vinyl acetate). The plasticized polymer adhered well to the wire and the coating was self extinguishing. The coated wire could be bent 180° without breaking the coating.

EXAMPLE 23

Strips of unpolished aluminum were dipped into the following strippable coating formulation and dried:

2 parts of chlorinated amorphous polypropylene (65.8% Cl)

1 part of the ethylene-vinyl acetate copolymer of Example 22
0.50 part of di(2-ethylhexyl)adipate
6 parts of toluene.

After drying, the polymer was easily stripped from the aluminum in one piece. The coated aluminum strips could be bent 180° without breaking the coating.

EXAMPLE 24

The following system was cast onto an 8" x 12" sheet of unpolished aluminum:

100 parts of chlorinated amorphous polypropylene (64% Cl)
30 parts of dioctylphthalate
30 parts of acrylonitrile-butadiene (Buna N) rubber
5 parts of epoxidized soy bean oil
4 parts of azobisformamide
160 parts of toluene.

Upon drying, the coated aluminum was placed in a forced draft air oven at 180° C. for 5 minutes. After cooling, the sample was stripped from the aluminum and the density measured. The polymer had a density of 50 lbs./ft.$^3$ and had a uniform cell size.

The followng blends of chlorinated amorphous polypropylene (66.2 weight percent Cl) and Buna N rubber were made by codissolving the ingredients in toluene. The properties were run on solution cast films of two mil thickness.

| Example | Weight Percent Buna N in Blend | Gloss, percent | Tensile Strength, p.s.i. At Yield | At Rupture | Percent Elongation |
|---|---|---|---|---|---|
| 25 | 25.0 | >100 | 3,880 | 3,880 | 0 |
| 26 | 33.3 | >100 | 3,340 | 1,810 | 173 |
| 27 | 40.0 | >100 | 779 | 2,110 | 500 |

EXAMPLE 28

A blend of 16.7 parts of the present CLAMP (60% Cl) and 16.7 parts of predominantly amorphous chlorinated, low molecular weight (approximately 10,000–15,000) polyethylene (53.3% Cl) in 66.6 parts of xylene was prepared and had a viscosity of 25° C. of 200 cp. and gave a hard, flexible nonburning cast film.

EXAMPLE 29

A blend of 50.0 parts of the present CLAMP (54.7% Cl) and 50.0 parts of predominantly amorphous chlorinated (48.3% Cl) polyethylene of molecular weight of about 40,000 in xylene was cast to a one mil thick film having the following characteristics:

Tensile strength, p.s.i.:
    (a) At yield _____ 1300
    (b) At rupture _____ 1050
Elongation _____percent__ 167
MVTR (gm./100 in.$^2$/24 hrs.) _____ 0.82

Most commercially available pigments, fillers and extenders such as ZnO, TiO$_2$, asbestos, mica, clay, and the like can be used in the chlorinated polypropylene coatings. The pigment type and amount will, of course, depend on the end use. For example, alkali-resistant pigments should be used in paints which are to contact alkaline materials. Moreover, the known foaming agents may be added to the present compositions to give cellular structure. These additives can be dispersed in the chlorinated polypropylene vehicles by means of the same equipment employed for other chlorine-containing polymers. Pebble mills and roller mills work very well. Chlorinated polypropylene paints can include thixotropic agents such as dimethyldioctadecylammonium bentonite or finely divided, solidified vegetable-oil derivatives. These agents prevent pigment settling and allow the painter to achieve greater thickness per coat. These paints can be applied by brushing, rolling, or spraying and are particularly useful where hard, tough, corrosion-resistant paints are required. Moreover, the present materials may be employed to improve the hardness, chemical resistance, and drying time of many alkyd paints as illustrated by the following Table 6.

TABLE 6

| | Weight Percent | |
|---|---|---|
| | Straight Alkyd | Modified Alkyd |
| Constituent: | | |
| Chlorinated polypropylene | | 10.70 |
| 70% by wt. in xylol of 32% phthalic anhydride and 55% castor oil | 44.50 | 30.30 |
| TiO$_2$ | 25.00 | 27.60 |
| Cobalt napthenate, 6% | 0.52 | 0.19 |
| Xylene | 29.98 | 31.04 |
| | 100.00 | 100.00 |
| Properties: | | |
| Viscosity at 25° C., cp | 487 | 382 |
| Weight percent solids | 56.10 | 59.68 |
| Sward hardness $^1$ | 12 | 33 |
| Drying time at 25° C., min. (dry to the touch) | 120 | 20 |

$^1$ Determined on coatings of equal thicknesses dried overnight at 60° C.

The invention has been described in detail with particular reference to preferred embodiments thereof, but, it will be understood that variations and modifications can be effected within the spirit and scope of the invention described hereinabove and in the appended claims.

We claim:
1. The composition of matter consisting essentially of chlorinated polypropylene which before chlorination is hexane-soluble and has a viscosity of below 40,000 cp. at 150° C., said chlorinated polypropylene containing from about 5 to 75% by weight of chlorine and less than .001% part by weight ash.
2. The composition of matter of claim 1 wherein the polypropylene has a viscosity of from about 10,000 to 30,000 cp. at 150° C.
3. The composition of matter of claim 1 wherein the chlorinated polypropylene contains from about 60 to 70% by weight of chlorine.
4. The composition of matter of claim 1 wherein the chlorinated polypropylene contains from about 5 to 30% by weight of chlorine.

References Cited

UNITED STATES PATENTS

| | | |
|---|---|---|
| 3,351,677 | 11/1967 | Barton et al. |
| 2,849,431 | 8/1958 | Baxter _____ 260—94.9 |
| 2,921,057 | 1/1960 | Mertzweiller _____ 260—94.9 |
| 2,978,430 | 4/1961 | Thompson _____ 260—31.8 |
| 3,023,180 | 2/1962 | Canterino _____ 260—94.9 |
| 3,192,188 | 6/1965 | Orthner _____ 260—94.9 |
| 3,228,791 | 1/1966 | Armour _____ 260—899 |

JAMES A. SEIDLECK, Primary Examiner

R. A. GAITHER, Assistant Examiner

U.S. Cl. X.R.

260—94.9, 22, 33.8, 31.8, 28.5, 30.6, 23, 31.6, 873, 897; 117—132